US010339950B2

(12) United States Patent
Fienberg et al.

(10) Patent No.: US 10,339,950 B2
(45) Date of Patent: Jul. 2, 2019

(54) BEAM SELECTION FOR BODY WORN DEVICES

(71) Applicant: MOTOROLA SOLUTIONS, INC., Chicago, IL (US)

(72) Inventors: Kurt S. Fienberg, Plantation, FL (US); David Yeager, Delray Beach, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 10 days.

(21) Appl. No.: 15/634,158

(22) Filed: Jun. 27, 2017

(65) Prior Publication Data

US 2018/0374495 A1 Dec. 27, 2018

(51) Int. Cl.

*G06F 17/00* (2019.01)
*G10L 21/0216* (2013.01)
*H04R 1/40* (2006.01)
*G10K 11/34* (2006.01)

(52) U.S. Cl.

CPC .......... *G10L 21/0216* (2013.01); *G10K 11/34* (2013.01); *H04R 1/406* (2013.01); *G10L 2021/02166* (2013.01)

(58) Field of Classification Search

CPC ...... G10L 2021/02166; G10L 21/0216; G10K 11/34; H04R 1/406

See application file for complete search history.

(56) References Cited

U.S. PATENT DOCUMENTS

| | | | | |
|---|---|---|---|---|
| 5,940,118 | A | 8/1999 | Van Schyndel | |
| 6,041,127 | A | 3/2000 | Elko | |
| 9,807,498 | B1 | 10/2017 | Harmke et al. | |
| 2014/0270231 | A1 | 9/2014 | Dusan et al. | |
| 2017/0150255 | A1 * | 5/2017 | Wang | H04R 3/005 |
| 2017/0230754 | A1 * | 8/2017 | Dusan | H04R 5/04 |

OTHER PUBLICATIONS

Merimaa, "Applications of a 3-D Microphone Array," 112th Audio Engineering Society Convention, 11 pages (2002).

* cited by examiner

*Primary Examiner* — Joseph Saunders, Jr.

(74) *Attorney, Agent, or Firm* — Michael Best & Friedrich LLP

(57) ABSTRACT

Systems and methods for beamforming audio signals received from a microphone array. One method includes receiving, with an electronic processor communicatively coupled to the microphone array, a plurality of audio signals from the microphone array. The method includes generating a plurality of beams based on the plurality of audio signals. The method includes detecting that an electronic device is in a body-worn position. The method includes, in response to the device being in the body-worn position, determining at least one restricted direction based on the body-worn position. The method includes generating, for each of the plurality of beams, a likelihood statistic. The method includes, for each of the beams, assigning a weight to the likelihood statistic based on the at least one restricted direction to generate a weighted likelihood statistic. The method includes generating an output audio stream from the plurality of beams based on the weighted likelihood statistic.

22 Claims, 4 Drawing Sheets

BEAM SELECTION FOR BODY WORN DEVICES

BACKGROUND OF THE INVENTION

Some microphones, for example, micro-electro-mechanical systems (MEMS) microphones, have an omnidirectional response (that is, they are equally sensitive to sound in all directions). However, in some applications it is desirable to have an unequally sensitive microphone. A remote speaker microphone, as used, for example, in public safety communications, should be more sensitive to the voice of the user than it is to ambient noise. Some remote speaker microphones use beamforming arrays of multiple microphones (for example, a broadside array or an endfire array) to form a directional response (that is, a beam pattern). Adaptive beamforming algorithms may be used to steer the beam pattern toward the desired sounds (for example, speech), while attenuating unwanted sounds (for example, ambient noise).

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
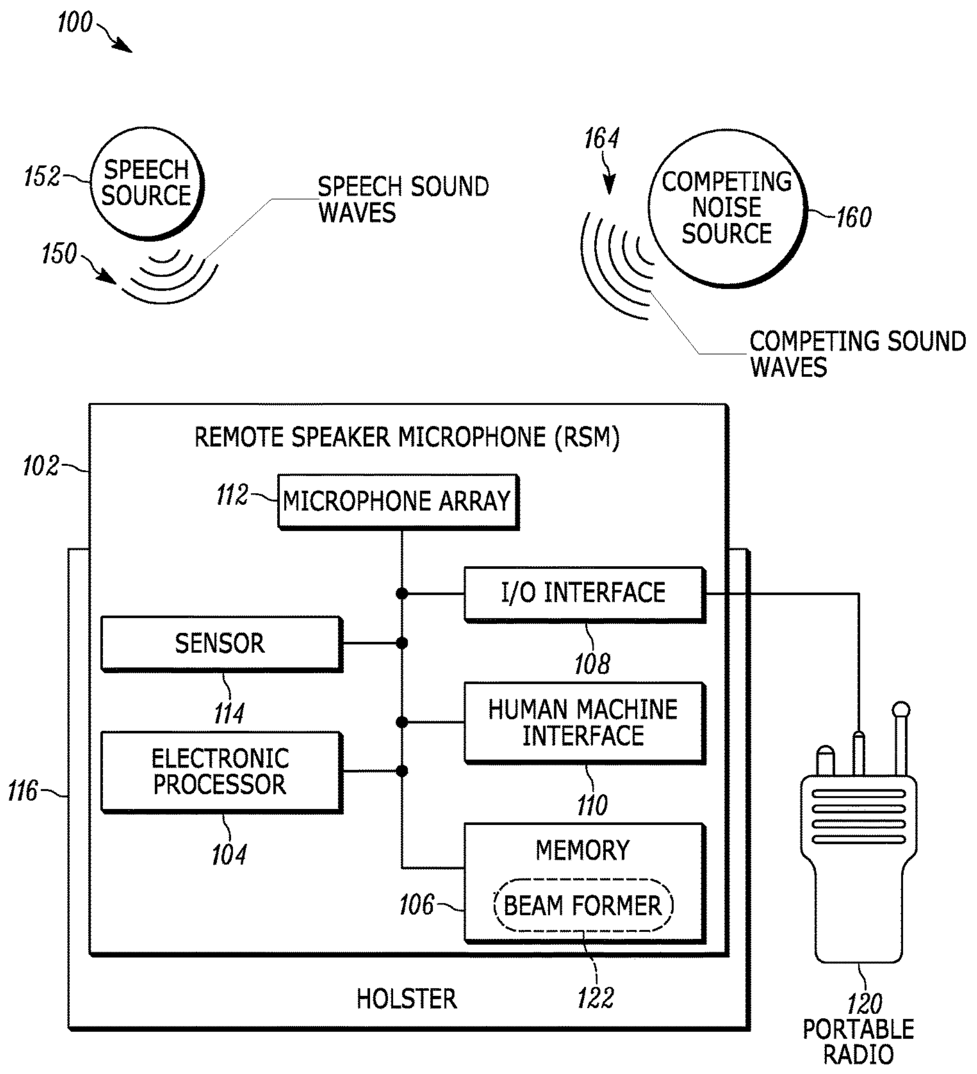
FIG. 1 is a block diagram of a beamforming system, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some communications devices, (for example, remote speaker microphones) use multiple-microphone arrays and adaptive beamforming to selectively receive sound coming from a particular direction, for example, toward a user of the communications device. The device selects and amplifies a beam or beams pointing in the direction of the desired sound source, and rejects (or nulls out) beams pointing toward any noise source(s). The device may also employ beam selection techniques to steer (that is, dynamically fine-tune) beams to focus on a desired sound source. Using such techniques, a communications device can amplify desired speech from the user, and reject interfering noise sources to improve speech reception and the intelligibility of the received speech.

However, when competing noise sources are speech or speech-like, and of a similar level of the user's voice at the device, it may be difficult for the communications device to differentiate between the user's voice and the competing noise sources using audio data alone. In some cases, the communications device may focus on an incorrect direction, selecting and amplifying a competing speech or speech-like noise source, while reducing or rejecting the user's speech level. As a consequence, current communications devices may transmit more of the interfering noise and less of the user's speech, which may render the user's speech unintelligible to devices receiving the transmission. To address this concern, some communications devices use non-acoustic sensors (for example, a camera or accelerometer) or secondary microphones to determine a location for the user. However, such solutions require extra hardware, which adds to the cost, weight, size, and complexity of the communications devices. Accordingly, systems and methods are provided herein for, among other things, beamforming audio signals received from a microphone array, taking into account whether the microphone array is positioned on the body of the user.

One example embodiment provides an electronic device. The electronic device includes a microphone array and an electronic processor communicatively coupled to the microphone array. The electronic processor is configured to receive a plurality of audio signals from the microphone array. The electronic processor is configured to generate a plurality of beams based on the plurality of audio signals. The electronic processor is configured to detect that an electronic device is in a body-worn position. The electronic processor is configured to, in response to the electronic device being in the body-worn position, determine at least one restricted direction based on the body-worn position. The electronic processor is configured to generate, for each of the plurality of beams, a likelihood statistic. The electronic processor is configured to, for each of the plurality of beams, assign a weight to the likelihood statistic based on the at least one restricted direction to generate a weighted likelihood statistic. The electronic processor is configured to generate an output audio stream from the plurality of beams based on the weighted likelihood statistic.

Another example embodiment provides a method for beamforming audio signals received from a microphone array. The method includes receiving, with an electronic processor communicatively coupled to the microphone array, a plurality of audio signals from the microphone array. The method includes generating a plurality of beams based on the plurality of audio signals. The method includes detecting that an electronic device is in a body-worn position. The method includes, in response to the electronic device being in the body-worn position, determining at least one restricted direction based on the body-worn position. The method includes generating, for each of the plurality of beams, a likelihood statistic. The method includes, for each of the plurality of beams, assigning a weight to the likelihood statistic based on the at least one restricted direction to generate a weighted likelihood statistic. The method includes generating an output audio stream from the plurality of beams based on the weighted likelihood statistic.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

It should be noted that, as used herein, the terms "beamforming" and "adaptive beamforming" refer to microphone beamforming using a microphone array, and one or more known or future-developed beamforming algorithms, or combinations thereof.

FIG. 1 is a block diagram of a beamforming system 100. The beamforming system includes a remote speaker microphone (RSM) 102 (for example, a Motorola® APX™ XE Remote Speaker Microphone). The remote speaker microphone 102 includes an electronic processor 104, a memory 106, an input/output (I/O) interface 108, a human machine interface 110, a microphone array 112, and a sensor 114. The illustrated components, along with other various modules and components are coupled to each other by or through one or more control or data buses that enable communication therebetween. The use of control and data buses for the interconnection between and exchange of information among the various modules and components would be apparent to a person skilled in the art in view of the description provided herein.

In the embodiment illustrated, the remote speaker microphone 102 is removably contained in a holster 116. The holster 116 worn by a user of the remote speaker microphone 102, for example on a uniform shirt of an emergency responder. The holster 116 is made of plastic or another suitable material, and is configured to securely hold the remote speaker microphone 102 while the user performs his or her duties. In some embodiments, the holster 116 includes a latch or other mechanism to secure the remote speaker microphone 102. The remote speaker microphone 102 is removable from the holster 116. In some embodiments, remote speaker microphone 102 can determine when it is in the holster 116. For example, the holster 116 may include a magnet or other object (not shown), which, when sensed by the sensor 114, indicates to the electronic processor 104 that the remote speaker microphone 102 is in the holster 116. In such embodiments, the sensor 114 is a magnetic transducer that produces electrical signals in response to the presence of the magnet or object. In some embodiments, the remote speaker microphone 102 detects its presence in the holster 116 by means of a mechanical switch, which, for example, is triggered by a protrusion or other feature of the holster that actuates the switch when the remote speaker microphone 102 is placed in the holster 116.

In some embodiments, the holster 116 is rotatable, which allows a wearer of the holster 116 to adjust the orientation of the remote speaker microphone 102. For example, the remote speaker microphone 102 may be oriented (with respect to the ground when the wearer is standing) vertically, horizontally, or another desirable angle. In such embodiments, the sensor 114 may be a gyroscopic sensor that produces electrical signals representative of the orientation of the remote speaker microphone 102.

In the example illustrated, the remote speaker microphone 102 is communicatively coupled to a portable radio 120 to provide input (for example, an output audio signal) to and receive output from the portable radio 120. The portable radio 120 may be a portable two-way radio, for example, one of the Motorola® APX™ family of radios. In some embodiments, the components of the remote speaker microphone 102 may be integrated into a body-worn camera, a portable radio, or another similar electronic communications device.

The electronic processor 104 obtains and provides information (for example, from the memory 106 and/or the input/output interface 108), and processes the information by executing one or more software instructions or modules, capable of being stored, for example, in a random access memory ("RAM") area or a read only memory ("ROM") of the memory 106 or in another non-transitory computer readable medium (not shown). The software can include firmware, one or more applications, program data, filters, rules, one or more program modules, and other executable instructions. The electronic processor 104 is configured to retrieve from the memory 106 and execute, among other things, software related to the control processes and methods described herein.

In some embodiments, the electronic processor 104 performs machine learning functions. Machine learning generally refers to the ability of a computer program to learn without being explicitly programmed. In some embodiments, a computer program (for example, a learning engine) is configured to construct an algorithm based on inputs. Supervised learning involves presenting a computer program with example inputs and their desired outputs. The computer program is configured to learn a general rule that maps the inputs to the outputs from the training data it receives. Example machine learning engines include decision tree learning, association rule learning, artificial neural networks, classifiers, inductive logic programming, support vector machines, clustering, Bayesian networks, reinforcement learning, representation learning, similarity and metric learning, sparse dictionary learning, and genetic algorithms. Using all of these approaches, a computer program can ingest, parse, and understand data and progressively refine algorithms for data analytics.

The memory 106 can include one or more non-transitory computer-readable media, and includes a program storage area and a data storage area. The program storage area and the data storage area can include combinations of different types of memory, as described herein. In the embodiment illustrated, the memory 106 stores, among other things, an adaptive beam former 122 (described in detail below).

The input/output interface 108 is configured to receive input and to provide system output. The input/output interface 108 obtains information and signals from, and provides information and signals to, (for example, over one or more wired and/or wireless connections) devices both internal and external to the remote speaker microphone 102.

The human machine interface (HMI) 110 receives input from, and provides output to, users of the remote speaker microphone 102. The HMI 110 may include a keypad, switches, buttons, soft keys, indictor lights, haptic vibrators, a display (for example, a touchscreen), or the like. In some embodiments, the remote speaker microphone 102 is user configurable via the human machine interface 110.

The microphone array 112 includes two or more microphones that sense sound, for example, the speech sound waves 150 generated by a speech source 152 (for example, a human speaking). The microphone array 112 converts the speech sound waves 150 to electrical signals, and transmits the electrical signals to the electronic processor 104. The electronic processor 104 processes the electrical signals received from the microphone array 112, for example, using the adaptive beamformer 122 according to the methods described herein, to produce an output audio signal. The electronic processor 104 provides the output audio signal to the portable radio 120 for voice encoding and transmission.

Oftentimes, the speech source 152 is not the only source of sound waves near the remote speaker microphone 102.

For example, a user of the remote speaker microphone 102 may be in an environment with a competing noise source 160 (for example, another person speaking), which produces competing sound waves 164. In order to assure timely and accurate communications, the microphones of the microphone array 112 are configured to produce a directional response (that is, a beam pattern) to pick up desirable sound waves (for example, from the speech source 152), while attenuating undesirable sound waves (for example, from the competing noise source 160).

Figure 2:
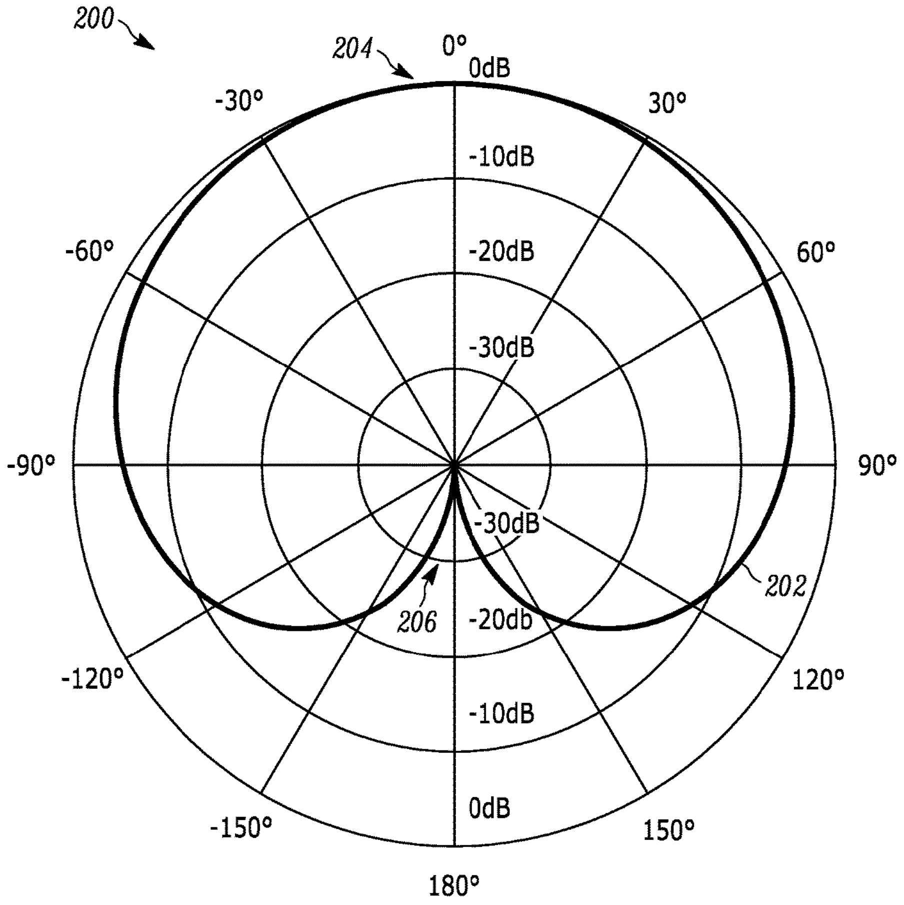
FIG. 2 is a polar chart of a beam pattern for a microphone array, in accordance with some embodiments.

In one example, as illustrated in FIG. 2, the microphone array 112 may exhibit a cardioid beam pattern. FIG. 2 is a polar chart 200 that illustrates an example cardioid beam pattern 202. As shown in the polar chart 200, the beam pattern 202 exhibits zero dB of loss at the front 204, and exhibits progressively more loss along each of the sides until the beam pattern 202 produces a null 206. In the example, the null 206 exhibits thirty or more dB of loss. Accordingly, sound waves arriving at the front 204 of the beam pattern 202 are picked up, sound waves arriving at the sides of the beam pattern 202 are partially attenuated, and sound waves arriving at the null 206 of the beam pattern are fully attenuated. Adaptive beamforming algorithms use electronic signal processing (for example, executed by the electronic processor 104) to digitally "steer" the beam pattern 202 to focus on a desired sound (for example, speech) and to attenuate undesired sounds. An adaptive beamformer uses an adjustable set of weights (for example, filter coefficients) to combine multiple microphone sources into a single signal with improved spatial directivity. The adaptive beamforming algorithm uses numerical optimization to modify or update these weights as the environment varies. Such algorithms use many possible optimization schemes (for example, least mean squares, sample matrix inversion, and recursive least squares). Such optimization schemes depend on what criteria are used as an objective function (that is, what parameter to optimize). For example, when the main lobe of a beam is in a known fixed direction, beamforming could be based on maximizing signal-to-noise ratio or minimizing total noise not in the direction of the main lobe, thereby steering the nulls to the loudest interfering source. Accordingly, beamforming algorithms may be used with a microphone array (for example, the microphone array 112) to isolate or extract speech sound under noisy conditions.

Figure 3:
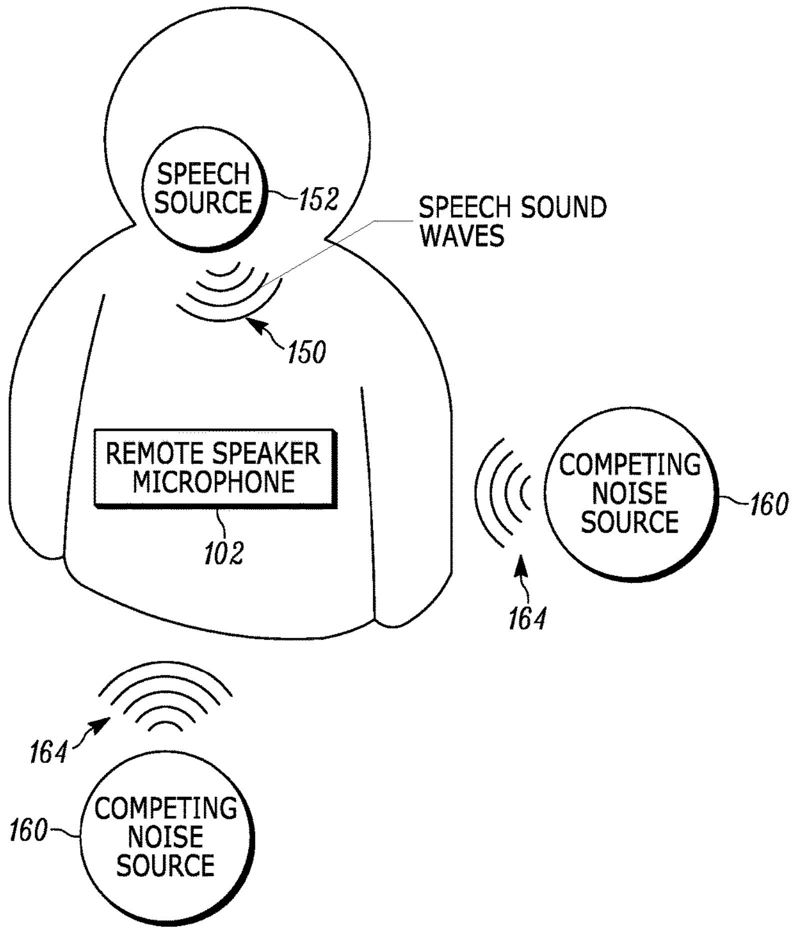
FIG. 3 illustrates a user (for example, a first responder) using a remote speaker microphone, in accordance with some embodiments.

For example, in FIG. 3, a user (that is, the speech source 152) is speaking and his or her voice (that is, the speech sound waves 150) arrive at the remote speaker microphone 102 from the top (relative to the remote speaker microphone 102). When the speech source 152 is the only source of speech-like sounds, the beamformer 122 is able to pick up the user's voice, despite some level of ambient noise. However, as illustrated in FIG. 3, one or more competing noise sources 160 may be present. For example, officer may be in the vicinity of other people who are talking loudly, loud music, a television or radio at a high volume in the background, or another loud, non-stationary, and sufficiently speech-like noise source. In such case, multiple speech-like signals are received at the remote speaker microphone 102. As noted above, adaptive beamformers steer a beam to focus on a desired sound and to attenuate competing, undesired noises.

Current beamformers use only audio data to discern which beam is picking up the user's voice (that is, the desired sound). Current beamformers assume that competing noise sources are in some sense not voice-like (for example, they are stationary), such that voice activity detection will not trigger. Current beamformers also assume that, if a competing noise source is voice-like, it is of a lower level than the user's speech when received at the microphone array 112. Current beamformers use voice detection to select voice-like sources, and choose among the detected voice-like sources (based on their levels) to choose a beam. As a consequence, when the desired sound and the competing sounds are all speech, or sufficiently speech-like, current beamforming algorithms, based only on audio data, may steer the beam incorrectly to a competing noise that is as loud as or louder than the user's speech. Accordingly, in some environments, using current beamforming algorithms, the electronic processor 104 and the microphone array 112 may not be able to form a beam that picks up the speech sound waves 150, while reducing the effect of the competing sound waves 164. Accordingly, embodiments provide, among other things, methods for beamforming audio signals received from a microphone array.

By way of example, the methods presented are described in terms of the remote speaker microphone 102, as illustrated in FIG. 1. This should not be considered limiting. The systems and methods described herein could be applied to other forms of electronic communication devices (for example, portable radios, mobile telephones, speaker telephones, telephone or radio headsets, video or tele-conferencing devices, body-worn cameras, and the like), which utilize beamforming microphone arrays and may be used in environments containing competing noise sources.

Figure 4:
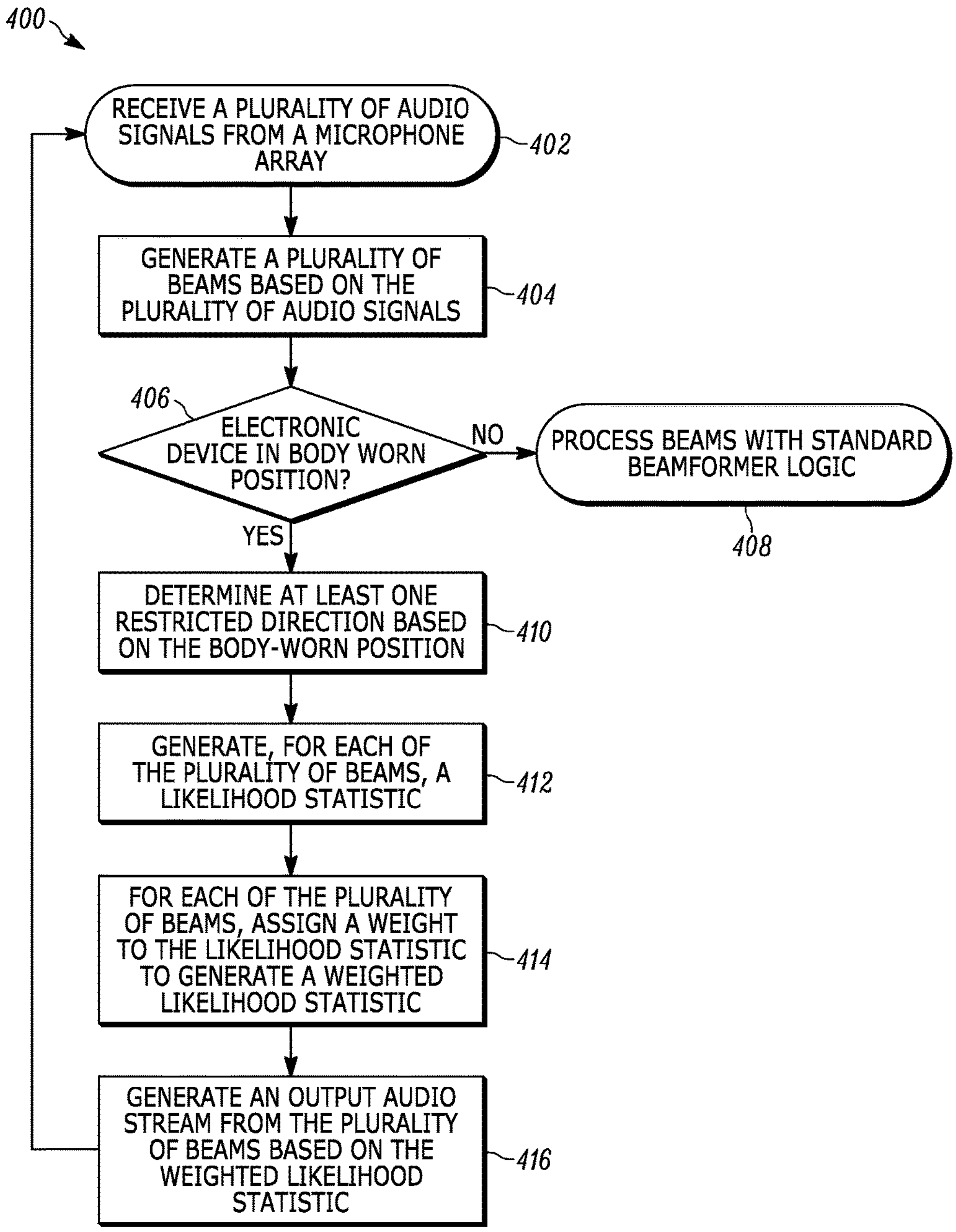
FIG. 4 is a flowchart of a method for beamforming audio signals received from a microphone array, in accordance with some embodiments.

FIG. 4 illustrates an example method 400 for beamforming audio signals received from the microphone array 112. The method 400 is described as being performed by the remote speaker microphone 102 and, in particular, the electronic processor 104. However, it should be understood that in some embodiments, portions of the method 400 may be performed external to the remote speaker microphone 102 by other devices, including for example, the portable radio 120. For example, the remote speaker microphone 102 may be configured to send input audio signals from the microphone array 112 to the portable radio 120, which, in turn, processes the input audio signals as described below.

At block 402, the electronic processor 104 receives a plurality of audio signals from the microphone array 112. The audio signals are electrical signals based on the speech sound waves 150, the competing sound waves 164, or a combination of both detected by the microphone array 112. At block 404, the electronic processor 104 generates (that is, forms) a plurality of beams based on the plurality of audio signals, using a beamforming algorithm (for example, the beamformer 122). Each of the plurality of beams is focused in a different direction relative to the remote speaker microphone 102 (for example, top, bottom, left, right, front, and back). The number of beams and their directions depends on the number of microphones in the microphone array 112 and the geometry of the microphones.

At block 406 the electronic processor 104 detects whether the remote speaker microphone 102 is in a body-worn position. As used herein, the term "body-worn position" indicates that the remote speaker microphone 102 is being worn on the body of the user. For example, the remote speaker microphone 102 may be removably attached to a portion of an officer's uniform, or may be placed in the holster 116, which is removably or permanently attached to a portion of the officer's uniform. In some embodiments, the electronic processor 104 determines that the remote speaker microphone 102 is in a body-worn position by receiving, from the sensor 114, a signal indicating that the remote speaker microphone 102 is in the holster 116. In some embodiments, the electronic processor 104 determines that the remote speaker microphone 102 is in a body-worn position by receiving a user input, for example, via the human machine interface 110. In some embodiments, determining the body-worn position includes determining where on the body the remote speaker microphone 102 is positioned. For example, the remote speaker microphone 102 may be positioned on the left, right, or center chest of the user, or on the left or right shoulder of the user.

In some embodiments, for example, where the holster 116 is rotatable, the electronic processor 104 also determines the orientation of the remote speaker microphone 102. For example, it may receive a signal from the sensor 114 or another sensor indicating the orientation of the remote speaker microphone 102 (for example, with respect to the orientation of torso of the user wearing the remote speaker microphone 102). In some embodiments, the electronic processor 104 determines the orientation of the remote speaker microphone 102 by receiving a user input, for example, via the human machine interface 110.

In some embodiments, when the remote speaker microphone 102 is not in a body-worn position, the electronic processor 104 processes the beams (formed at block 404) with standard beamformer logic.

At block 410, in response to detecting that remote speaker microphone 102 is in the body-worn position, the electronic processor 104 determines one or more restricted directions based on the body-worn position. A restricted direction is a direction, based on the remote speaker microphone 102 being body-worn, from which it is unlikely that the user's voice is originating. For example, it is unlikely that the user's voice would originate from behind the remote speaker microphone 102. In another example, it is unlikely that the user's voice would originate from underneath of the remote speaker microphone 102. In another example, it is unlikely that the user's voice would originate from left side of the remote speaker microphone 102 when the remote speaker microphone 102 is worn on the user's left shoulder.

As noted above, in some embodiments, the electronic processor 104 determines both a body-worn position and an orientation for the remote speaker microphone 102. In such embodiments, the electronic processor 104 determines one or more restricted directions based on the body-worn position and the orientation. For example, when the remote speaker microphone 102 is worn in the center of the chest at a ninety-degree angle, it is less likely that the user's voice would originate from the top or bottom of the remote speaker microphone 102. It is more likely that the user's voice would be received by one of the sides of the remote speaker microphone 102, depending on whether the top remote speaker microphone 102 is oriented toward the user's left or right side. In another example, the remote speaker microphone 102 may be oriented at a forty-five degree angle toward the user's right shoulder, making it less likely that the user's voice would originate from the right or bottom of the remote speaker microphone 102.

At block 412, the electronic processor 104 generates, for each of the plurality of beams, a likelihood statistic. A likelihood statistic is a measurable characteristic or quality of a beam, which may be used to evaluate the beam to determine the likelihood that the beam is directed to or contains the user's voice. In some embodiments, the likelihood statistic is a speech level, which indicates the loudness or volume of the speech. In some embodiments, the likelihood statistic is a beam signal-to-noise ratio estimate, which indicates how many dB of separation exist between the speech and the background noise. In other embodiments, the likelihood statistic is a front-to-back direction energy ratio for the beam. In yet other embodiments, the likelihood statistic is a voice activity detection metric, which is an indication of how likely it is that the audio captured by the beam is speech. In some embodiments, the electronic processor 104 generates more than one likelihood statistic for each of the plurality of beams.

In some embodiments, the electronic processor 104 eliminates at least one of the plurality of beams to generate a plurality of eligible beams based on at least one restricted direction. For example, the electronic processor 104 may eliminate any beams facing to the rear of the remote speaker microphone 102 because it is unlikely that the user's voice would originate from behind the remote speaker microphone 102. The beam or beams may be eliminated before or after the likelihood statistic(s) are generated (at block 412). In such embodiments, the remainder of the method 400 is performed using the plurality of eligible beams.

In some embodiments, the electronic processor 104 does not eliminate any beams outright, but instead weights the likelihood statistics and evaluates all of the plurality of beams, as described below. In other embodiments, the electronic processor 104 eliminates one or more beams, and then weights the likelihood statistics and evaluates the plurality of eligible beams.

At block 414, the electronic processor 104, assigning a weight to the likelihood statistic for each of the plurality of beams to generate a weighted likelihood statistic for each beam. The weight is a numeric multiplier applied to the likelihood statistic to either increase or decrease the value of the likelihood statistic. The weight is based on some knowledge about the beam.

In some embodiments, the weight is based on at least on the one of the restricted directions. For example, while it may be unlikely that the user's voice will originate from underneath the remote speaker microphone 102, it is not impossible. The remote speaker microphone 102 may be jostled during physical activity, and rotate into an upside down position, for example. Accordingly, the electronic processor 104 may assign a weight that reduces the likelihood statistic for the beam(s) pointing to the bottom of the remote speaker microphone 102, but does not eliminate it from consideration. Under ordinary operation, when upright, the weighted likelihood statistics for the beams pointing downward would make it more likely that those beams are not chosen to generate the audio output stream (see block 416). However, when upside down, the likelihood statistics for the beams pointing from the top of the remote speaker microphone 102, because they are pointing away from the user's speech, would likely be lower than the weighted likelihood statistics for the beams pointing from the bottom of the remote speaker microphone 102, which are pointing toward the user's speech.

In some embodiments, the weight is based on prior information or assumptions about the remote speaker microphone 102, for example, retrieved from the memory 106 or received via a user input through the human machine interface 110. For example, the remote speaker microphone 102 may usually be worn on the user's left side. In another example, the remote speaker microphone 102 may be rarely worn upside down (for example, when integrated with a body worn camera).

Once mounted, body-worn devices are not often moved. As a consequence, in some embodiments, the electronic processor 104 assigns a weight based on historical beam selection data. In some embodiments, the electronic processor 104 stores a history of which beams have been selected in the memory 106, and bases future selections on the historical selections. For example, the electronic processor 104 may determine the weights using a machine learning algorithm (for example, a neural network or Bayes classifier). Over time, as beams are selected, the machine learning algorithm may determine that particular beam directions are more determinative than others, and thus increase the weight for future beams in those directions.

Because a body-worn device may not be returned to the same location when it is removed and again body-worn, in some embodiments, when a body-worn device is removed, the historical data is reset. For example, the electronic processor 104 may receive, from the sensor, a signal indicating that the remote speaker microphone 102 is no longer in the body worn position. For example, the sensor signal may indicate that the remote speaker microphone 102 is no longer in the holster 116. In response to receiving the signal, the electronic processor 104 resets the historical beam selection data.

At block 416, the electronic processor generates an output audio stream from the plurality of beams based on the weighted likelihood statistic. The output audio stream is the audio that is sent to the portable radio 120 for voice encoding and transmission. In some embodiments, the electronic processor 104 selects one of the plurality of beams, from which to generate the output audio stream. For example, the electronic processor 104 may select the beam with the likelihood statistic having the highest value. In some embodiments, multiple likelihood statistics form a vector for each beam, and the beam is selected using the vectors. In some embodiments, the beam is selected using machine learning, for example, a Bayes classifier as expressed in the following equation:

$$P(i\text{-}th\ \text{beam}|X_{audio})=P(X_{audio}i\text{-}th\ \text{beam})P(i\text{-}th\ \text{beam})/P(X_{audio})$$

Where:

P(i-th beam|$X_{audio}$) is the probability that the beam being processed includes the user's speech based on the likelihood statistic for the beam;

P($X_{audio}$|i-th beam) is probability that the beam includes the user's speech, as determined using the standard beamforming algorithm without using weighting;

P(i-th beam) is the weight; and $X_{audio}$ is a likelihood statistic for the beam.

As noted above, P(i-th beam) may be adjusted over time based on historical beam selections.

In some embodiments, the electronic processor 104 selects more than one beam based on the weighted likelihood statistic, and mixes the audio from the selected beams to produce the audio output stream. For example, the electronic processor 104 may select the two most likely beams. Regardless of how it is generated, the audio output stream may then be further processed (for example, by using other noise reduction algorithms) or transmitted to the portable radio 120 for voice encoding and transmission.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An electronic device, the electronic device comprising:
a microphone array; and
an electronic processor communicatively coupled to the microphone array and configured to
receive a plurality of audio signals from the microphone array;
generate a plurality of beams based on the plurality of audio signals;
detect that an electronic device is in a body-worn position; and
in response to the electronic device being in the body-worn position,
determine at least one restricted direction based on the body-worn position;
generate, for each of the plurality of beams, a likelihood statistic having a value indicative of the likelihood that the beam is directed to a desired sound source;
for each of the plurality of beams, assign a weight to the likelihood statistic to adjust the value of the likelihood statistic based on the at least one restricted direction and on prior information about the electronic device to generate a weighted likelihood statistic; and
generate an output audio stream from the plurality of beams based on the weighted likelihood statistic.

2. The device of claim 1, further comprising:
a sensor, communicatively coupled to the electronic processor, and positioned to sense the presence of the electronic device in a holster;
wherein the electronic processor is further configured to
receive, from the sensor, a signal indicating that the electronic device is in the holster; and
determine that the device is in a body-worn position based on the signal.

3. The device of claim 1, wherein the electronic processor is further configured to
receive, a user input; and
determine that the device is in a body-worn position based on the user input.

4. The device of claim 1, wherein the likelihood statistic is one selected from the group consisting of a speech level, a beam signal-to-noise ratio estimate, a front-to-back direction energy ratio, and a voice activity detection metric.

5. The device of claim 1, wherein the electronic processor is further configured to, in response to the electronic device being in the body-worn position,
generate, for each of the plurality of beams, a second likelihood statistic;
for each of the plurality of beams, assign a second weight to the second likelihood statistic based on the at least one restricted direction to generate a second weighted likelihood statistic; and
generate the output audio stream based on the weighted likelihood statistic and the second weighted likelihood statistic.

6. The device of claim 1, wherein the electronic processor is further configured to assign a weight to the likelihood statistic based on historical beam selection data.

7. The device of claim 6, further comprising:
a sensor, communicatively coupled to the electronic processor, and positioned to sense the presence of the electronic device in a holster;
wherein the electronic processor is further configured to
receive, from the sensor, a signal indicating that the electronic device is no longer in the body worn position; and
in response to receiving the signal, reset the historical beam selection data.

8. The device of claim 1, wherein the electronic processor is further configured to generate the output audio stream based on one of the plurality of beams selected based on the weighted likelihood statistic.

9. The device of claim 1, wherein the electronic processor is further configured to mix at least two of the plurality of beams based on the weighted likelihood statistic to generate the output audio stream.

10. The device of claim 1, wherein the electronic processor is further configured to, in response to the electronic device being in the body-worn position,
eliminate, based on the at least one restricted direction, at least one of the plurality of beams to generate a plurality of eligible beams; and
generate the output audio stream from the plurality of eligible beams based on the weighted likelihood statistic.

11. The device of claim 1, wherein the electronic processor is further configured to, in response to the electronic device being in the body-worn position,
determine an orientation of the electronic device; and
determine at least one restricted direction based on the body-worn position and the orientation.

12. A method for beamforming audio signals received from a microphone array, the method comprising:
receiving, with an electronic processor communicatively coupled to the microphone array, a plurality of audio signals from the microphone array;
generating a plurality of beams based on the plurality of audio signals;
detecting that an electronic device is in a body-worn position; and
in response to the electronic device being in the body-worn position,
determining at least one restricted direction based on the body-worn position;
generating, for each of the plurality of beams, a likelihood statistic having a value indicative of the likelihood that the beam is directed to a desired sound source;
for each of the plurality of beams, assigning a weight to the likelihood statistic to adjust the value of the likelihood statistic based on the at least one restricted direction and on prior information about the electronic device to generate a weighted likelihood statistic; and generating an output audio stream from the plurality of beams based on the weighted likelihood statistic.

13. The method of claim 12, wherein detecting that an electronic device is in a body-worn position includes receiving, from a sensor, a signal indicating that the electronic device is in a holster.

14. The method of claim 12, wherein detecting that an electronic device is in a body-worn position includes receiving a user input.

15. The method of claim 12, wherein generating a likelihood statistic includes generating one selected from the group consisting of a speech level, a beam signal-to-noise ratio estimate, a front-to-back direction energy ratio, and a voice activity detection metric.

16. The method of claim 12, further comprising:

in response to the electronic device being in the body-worn position, generating, for each of the plurality of beams, a second likelihood statistic; and for each of the plurality of beams, assigning a second weight to the second likelihood statistic based on the at least one restricted direction to generate a second weighted likelihood statistic;

wherein generating an output audio stream includes generating an output audio stream based on the weighted likelihood statistic and the second weighted likelihood statistic.

17. The method of claim 12, wherein assigning a weight to the likelihood statistic includes assigning a weight based on historical beam selection data.

18. The method of claim 17, further comprising:

receiving, from a sensor, a signal indicating that the electronic device is no longer in the body worn position; and in response to receiving the signal, resetting the historical beam selection data.

19. The method of claim 12, wherein generating an output audio stream includes selecting one of the plurality of beams based on the weighted likelihood statistic.

20. The method of claim 12, wherein generating an output audio stream includes mixing at least two of the plurality of beams based on the weighted likelihood statistic.

21. The method of claim 12, further comprising:

in response to the electronic device being in the body-worn position, eliminate, based on the at least one restricted direction, at least one of the plurality of beams to generate a plurality of eligible beams;

wherein generating an output audio stream from the plurality of beams based on the weighted likelihood statistic includes generating an output audio stream from the plurality of eligible beams.

22. The method of claim 12, further comprising:

in response to the electronic device being in the body-worn position, determining an orientation of the electronic device; and wherein determining the at least one restricted direction includes determining the at least one restricted direction based on the body-worn position and the orientation.

* * * * *